United States Patent [19]

Probst

[11] Patent Number: 4,524,576
[45] Date of Patent: Jun. 25, 1985

[54] WINDROWED HAY FLUFFING AGRICULTURAL IMPLEMENT

[76] Inventor: Evan N. Probst, RFD Box 344, Heber, Utah 84032

[21] Appl. No.: 585,560

[22] Filed: Mar. 2, 1984

[51] Int. Cl.³ .............................................. A01D 79/02
[52] U.S. Cl. ......................................... 56/372; 56/364
[58] Field of Search ................. 56/372, 370, 366, 364, 56/DIG. 21

[56] References Cited

U.S. PATENT DOCUMENTS

| | | | |
|---|---|---|---|
| 2,527,887 | 10/1950 | Martin | 56/364 |
| 2,529,422 | 11/1950 | Sampson | 56/372 |
| 3,059,403 | 10/1962 | Bamford et al. | 56/372 |
| 3,585,791 | 6/1971 | Batog | 56/364 |
| 3,713,283 | 1/1973 | Fritz | 56/364 |
| 3,924,391 | 12/1975 | Cheatum | 56/364 |
| 4,129,978 | 12/1978 | Friesen | 56/364 |
| 4,161,859 | 7/1979 | Storm | 56/364 |
| 4,411,127 | 10/1983 | Diederich, Jr. | 56/364 |

*Primary Examiner*—Jay N. Eskovitz
*Attorney, Agent, or Firm*—Mallinckrodt, Mallinckrodt, Russell & Osburn

[57] ABSTRACT

An agricultural implement adapted to be passed over and along windrows of hay, grain, and other crop vegetation lying cut in a field, for fluffing such windrows without turning them upside down or displacing them in the field, has a rotary pick-up device with preferably spring-loaded pick-up teeth that progressively withdraw from the picked-up mass of material as such material is carried backwardly, and a discharge arrangement that minimizes hang-up of the discharging material. Provision is preferably made for driving the pick-up device at infinitely variable speeds independently of the speed of travel of the implement along the lengths of the windrows, and for adjustably determining the width and height of the fluffed windrows.

13 Claims, 8 Drawing Figures

WINDROWED HAY FLUFFING AGRICULTURAL IMPLEMENT

BACKGROUND OF THE INVENTION

1. Field

The invention has to do with equipment for picking up windrowed hay and fluffing it to promote drying, so the time between cutting and baling will be reduced and the effects of wet weather effectively overcome.

2. State of the Art

A variety of tractor-drawn, agricultural implements have been proposed heretofore to fluff windrowed hay or grain lying in a field after cutting, so air can pass through the mass of cut material to speed drying and, in the case of hay, to enable baling and harvesting of the hay sooner than would otherwise be possible, see U.S. Pat. Nos. 2,330,910; 2,559,862; 2,675,665; 2,719,399; and 3,084,497. This is particularly desirable when windrowed hay has been rained on, since it is important to dry the hay before it molds. Despite the several implements proposed by these patents, the most common procedure currently used in attempting to satisfactorily fluff windrowed hay is to turn the windrows over by using a tractor-drawn side-delivery, raking implement. However, raking in this manner places fresh hay from the bottom of the windrow on top to be undesirably blanched by the sun.

An additional U.S. Pat. No. 2,674,839 discloses a hay baler which can be utilized as a windrowed hay fluffer and does not turn over the windrow as it deposits it several feet from the original windrow. It employs the auger of the baler mechanism to move the picked-up hay sideways for passage onto a transversly sloping, discharge platform and for discharge at the upper end of the platform to form a new windrow parallel with the location of the old one.

Although fluffing implements heretofore proposed have supposedly been designed to accomplish fluffing by lifting and redepositing the cut materials, without stirring, spreading, or scattering, they must have fallen short in various aspects of performance, since none are commercially available. This is understandable when it is realized that much experimentation was necessary to arrive at the features of the present invention, which, after many trails, have been found to be important in achieving successful results.

While the implements of the prior art all employ, in one way or another, a rotary liftng device equipped with outwardly projecting tines, i.e. pick-up teeth, and while some employ one or another form of cleaning tines projecting between the teeth, or some form of stripper plates between which the teeth project, some form of guide plates at the ends of the lifting device to maintain windrow formation, and a downwardly sloping platform at the rear over which the material passes in discharging form the implement, apparently none have really overcome the persistent tendency I have encountered for hay to hang up on the implement and interfere with clean and effective discharge. Moreover, none have seemed to recognize nor to have effectively dealt with the need for flexibility in handling hay under varying conditions.

For example, in most instances it is desirable to have the speed of rotation of the pick-up device equal the ground speed of the implement. However, with grass hay, or in the morning when the leaves of alfalfa hay will stay on the stalks because of dew, a faster speed can be used advantageously to facilitate the operation. Also, when confronted with heavy green hay, a faster than ground speed is desirable for rotation of the pick-up device.

SUMMARY OF THE INVENTION

In accordance with the invention, regardless of other details of construction, I have provided for driving and controlling the ground speed of a hay, grain, or other vegetation pick-up device in an implement of the type concerned independently of the ground speed of the drive vehicle, thereby enabling operation of such pick-up device in accordance with conditions in the field and making possible completion of the job in an unusually short time when field conditions are favorable. This is preferably accomplished by the provision of a standard hydraulic motor for driving the pick-up device and a standard hydraulic flow control valve mechanism of infinitely variable type for controlling such motor from the hydraulic system of the drive vehicle, usually a standard farm tractor attached to the fluffing implement by the usual three-point hitch.

Whether or not the above is provided, other features of the invention for achieving maximum usefulness are the provision of adjustable wings at opposite ends of the vegetation pick-up device, so the width and height of the fluffed vegetation windrows deposited by the implement can be controlled as desired; the provision of a set of stripper bars for the teeth of the vegetation pick-up device, which stripper bars are so arranged and positioned that the lengths of the teeth projecting through the spaces between such stripper bars, respectively, progressively shorten as the teeth are moved rearwardly but continue to project therethrough and propel the picked-up vegetation rearwardly toward the point of ultimate discharge from the implement; the provision of downwardly sloping, rearward extensions of the respective stripper bars to provide a discharge deck for the vegetation through and across much of which the teeth continue to project and propel the vegetation toward the lower end thereof; and the provision of a bar of substantially cylindrical formation extending transversely across such deck adjacent to the lower end thereof for preventing hang-up of the discharging vegetation.

THE DRAWINGS

In the accompanying drawings, which show the best mode presently contemplated for carrying out the invention with respect to windrowed hay lying in a field:

FIG. 1 is a perspective view of the fluffing implement attached by the usual three-point hitch to a standard farm tractor for forward travel over and along windrowed hay, the view being taken from the lefthand side looking forwardly, with only the rearward portion of the tractor being shown;

FIG. 2, a top plan view of only the implement, the view being drawn to a reduced scale and turned in the opposite direction from that of FIG. 1;

FIG. 3, a side elevation of the implement as shown in FIG. 2;

FIG. 4, a front elevation of the implement as shown in FIGS. 2 and 3;

FIG. 5, a rear elevation of the implement as shown in FIGS. 2, 3, and 4;

FIG. 6, a longitudinal vertical section taken on the line 6—6 of FIG. 2 and drawn to a considerably larger scale, with a dotted respresentation added to show how the pick-up teeth progressively shorten relative to their projection between the stripper bars as the pick-up device rotates;

FIG. 7, a fragmentary transverse section taken on the line 7—7 of FIG. 6; and

FIG. 8, a fragmentary transverse section taken on the line 8—8 of FIG. 5 and drawn to the larger scale of FIGS. 6 and 7.

DETAILED DESCRIPTION OF ILLUSTRATED EMBODIMENT

In the form illustrated, the windrowed hay fluffing implement of the invention comprises a vehicle frame 10 having a set of caster wheels 11 at the rear and a three-point tractor hitch 12 at the forward end. The implement is shown attached to the corresponding three-point hitch of a standard farm tractor 13, FIG. 1.

Figure 2:
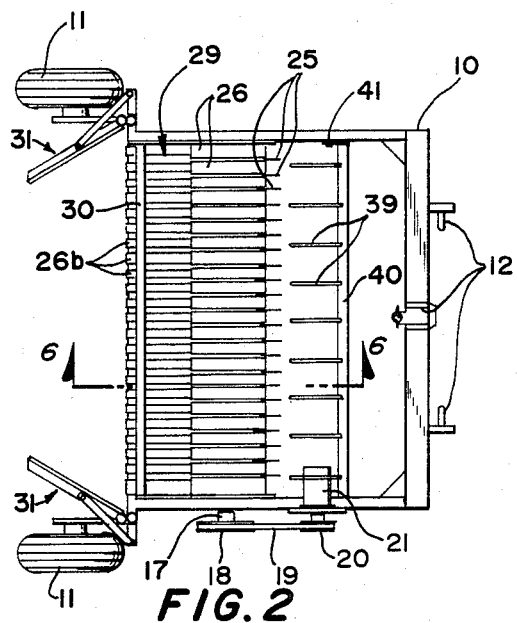
Figure 5:
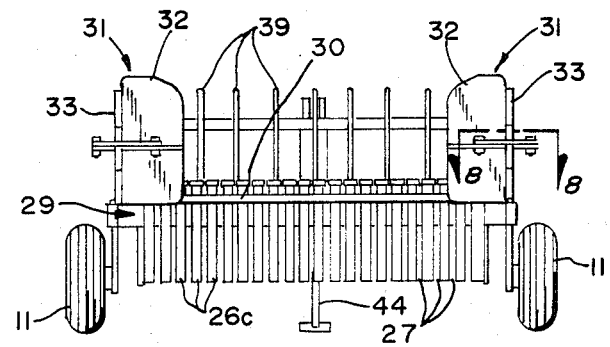
Figure 3:
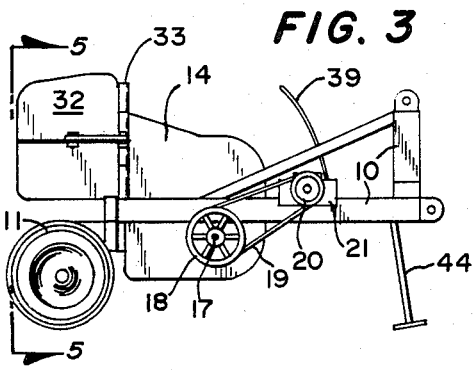
Figure 4:
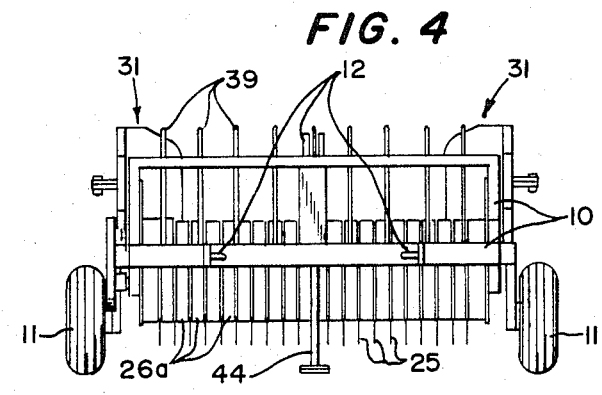
Figure 6:
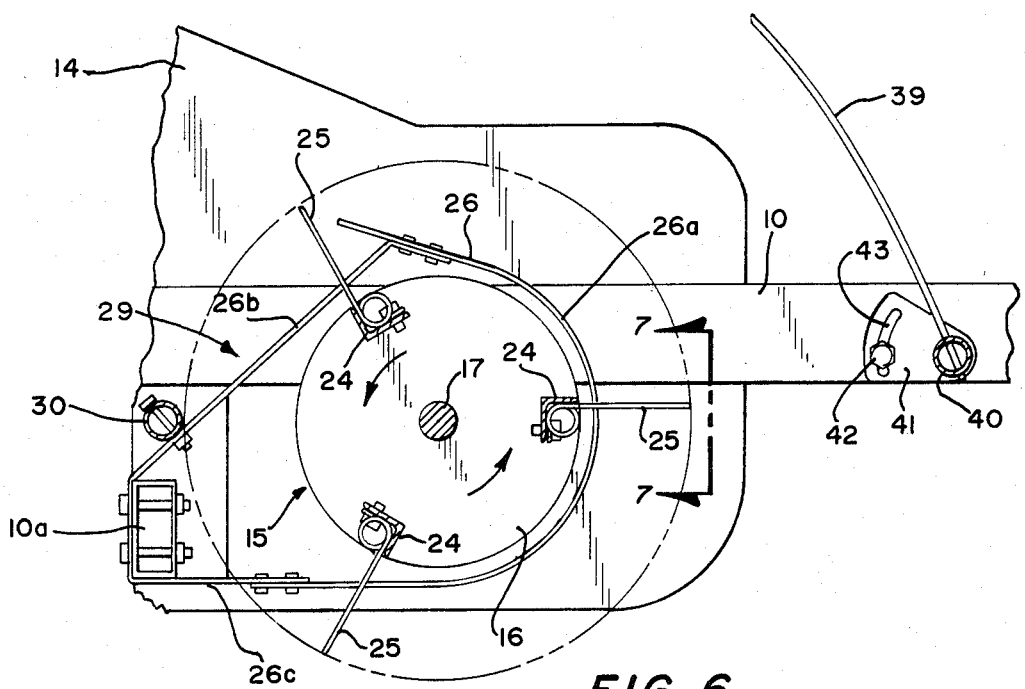

Mounted for rotation transversely of upstanding side plates 14 is a hay pick-up device 15, see particularly FIG. 6, comprising circular end plates 16 fixedly secured to a shaft 17 which is journaled in the frame and carries a pulley 18, FIGS. 2 and 3, driven by a belt 19 from a drive pulley 20 of a standard hydraulic motor 21, such as an Adan 100-2, manufactured by Adan Hydraulics, Winston-Salem, N.C.

Figure 1:
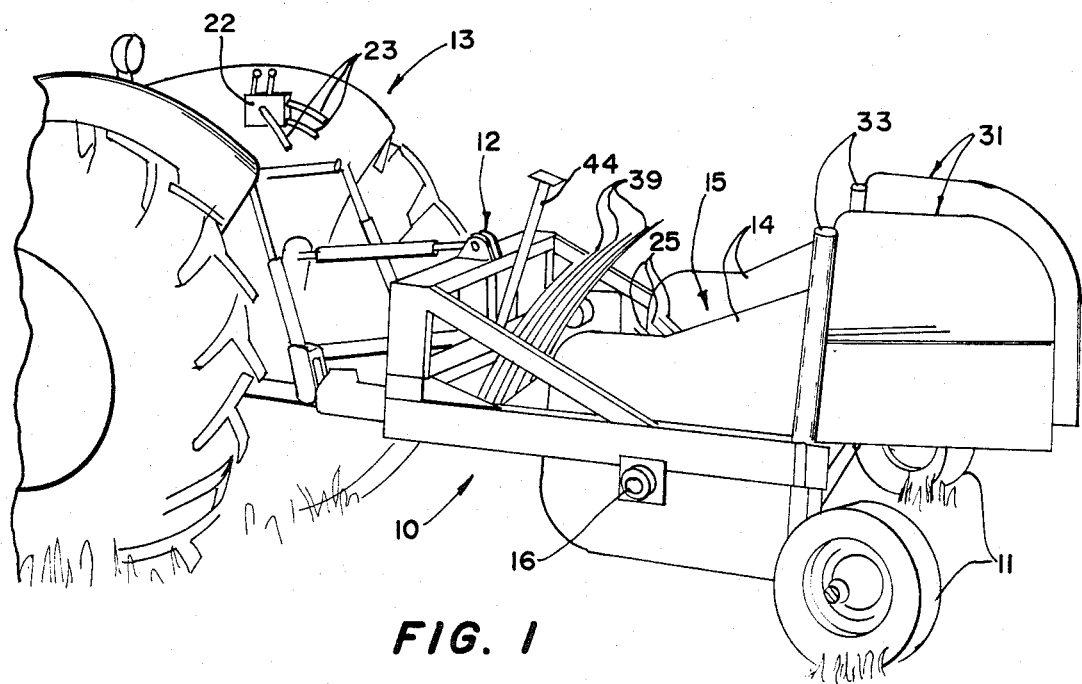

Motor 21 is powered from the hydraulic system of tractor 13 in the usual manner, and its speed is controlled by the driver of the tractor operating a standard, hydraulic, flow control valve 22, FIG. 1, such as a Dayton, Model no. 6X842, manufactured by Dayton Electric Manufacturing Company, Chicago, Ill., which is connected into the hydraulic system of the tractor, as by the usual pressure hoses 23.

Figure 7:
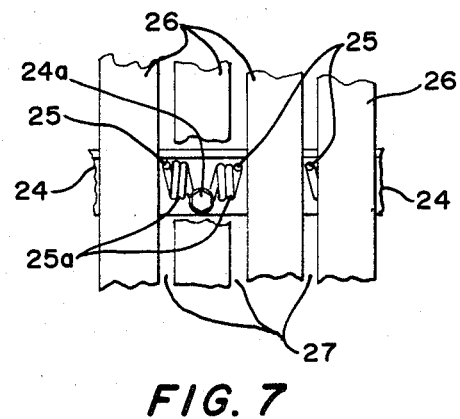

Pick-up device 15 further comprises transversely-extending, teeth-carrying bars 24, FIG. 6, rigidly connected at their ends to end plates 16 and spaced symmetrically in concentric arrangement about shaft 17. As shown, bars 24 are structural steel angles opening outwardly and each carrying a series of spring-loaded, pick-up teeth 25 mutually spaced along the length of the bar, see particularly FIGS. 6 and 7, each pair of adjoining teeth having their coiled spring ends 25a bolted in common to the corresponding bar 24 as illustrated at 24a in FIG. 7.

As can be best seen in FIG. 6, a set of stripper bars 26 extend in mutually spaced relationship transversely of the implement, being arranged and positioned to receive therebetween the teeth 25 as the pick-up device rotates counterclockwise and so that the lengths of such teeth projecting through the respective spaces 27 between the bars progressively shorten as the teeth are moved rearwardly of the implement during such counterclockwise rotation, see the dotted line indicating the path of travel of the outer tips of teeth 25 about shaft 17 as a center.

In the illustrated embodiment, the forward portions 26a of the stripper bars 26 are concentric with pick-up device 15 and the remaining portions extend rearwardly therefrom and connect with extensions 26b and 26c thereof, which are preferably formed integrally as single strips that loop around and are secured to a rear transverse member 10a of frame 10. Such frame member 10a is dropped below the level of the frame proper as shown in FIG. 6 to provide clearance for the rotating stripper teeth.

The rearward extensions 26b of the upper portions of stripper bars 26 are bolted to the latter, preferably forwardly of the tips thereof to leave a relatively short overhang 28 as a launch pad for material being propelled onto the discharge deck 29 formed by such upper rearward extensions 26b. The rearward extensions 26c of the lower portions of the stripper bars are also bolted to the latter and serve to complete the loop formation for support purposes, but are otherwise nonfunctional.

Although the pick-up teeth 25 progressively withdraw from the mass of hay being propelled rearwardly across deck 29, there is no need that they withdraw completely except, in this illustrated embodiment, for the fact that they must clear frame member 10a. Accordingly, they are here arranged to project through much of deck 29 and to withdraw therefrom shortly before reaching the discharge end thereof.

To prevent wrapping of the hay about frame member 10a and hang-up thereof in the discharge from the implement, a bar 30 of cylindrical formation is secured upon and extends transversely across deck 29 near the lower end thereof. Advantageously, such bar is a length of plastic pipe bolted along its length to several of the stripper bar extensions 26b so as to be adjustable in position as found desirable for any given conditions.

Figure 8:
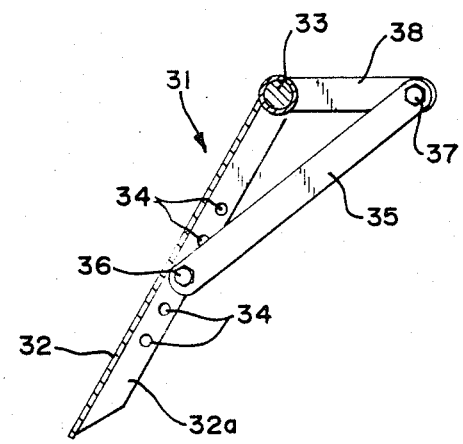

A feature of the invention, which is important in the overall combination, is the provision of adjustable side wings for confining the width of the discharge as desired. Thus, in the form illustrated, a pair of side wings 31 is provided at opposite sides of the implement, preferably extending rearwardly from the rearward end of discharge deck 29 as best shown in FIG. 2 in order to form the windrow as the hay falls. Each of these wings 31 comprises a vertical wing plate 32 pivotally mounted on a post 33 rising from rigid securement to frame 10, see particularly FIG. 8. For purposes of adjustment, a reinforcing crossbar 32a of wing plate 32 is provided with a series of holes 34, to a selected one of which the end of a link 35 is secured as by a bolt 36, the opposite end of the link being pivotally attached at 37 to the free end of an arm 38 which is independently pivotally mounted on and extends from post 33.

For preventing loss of hay forwardly of the implement as the pick-up teeth 25 carry it upwardly, a series of mutually spaced, hold-down bars 39 extends transversely across the implement forwardly of pick-up device 15. A feature of the invention is that such hold-down bars are adjustably positioned, as by rigid attachment to a crossbar 40, FIG. 6, which is journaled at its opposite ends in frame 10 and provided with an adjustment plate 41 extending rigidly therefrom for securement to frame 10 in a selected adjusted position by a bolt 42 passing through an arcuate slot 43 in such adjustment plate 41. This enables the exercise of some control over the height of the fluffed windrows.

For convenience in supporting the implement when detached from tractor 13, a pivotal leg 44 is desirably provided forwardly in frame 10 for raising and lowering as required.

Whereas the invention is here illustrated and described with respect to an implement adapted particularly to fluff windrowed hay, similar implements may be employed, with or without modifications which will be apparent to those skilled in the art, for fluffing other crop vegetation windrowed in a field, and other embodiments of the invention may be constructed by those skilled in the art for the purposes of the invention without departing from the invention as defined by the claims that follow.

I claim:

1. In an agricultural implement adapted to be drawn through a field behind a tractive vehicle and especially useful for fluffing cut and windrowed vegetation in the field as such implement is drawn over and along a windrow, which implement includes means forwardly thereof for attachment to a tractive vehicle a rotary pick-up device having elongate teeth extending therefrom in mutually spaced relationship around its periphery and along its length, a frame in which said pick-up device is mounted for rotation transversely of and opposite to the direction of travel of the implement, and means for driving said pick-up device as the implement travels over a windrow, the combination therewith of a series of stationary stripper bars mutually spaced along said pick-up device and being forwardly substantially concentric therewith about substantially a semi-circle, so as to receive said teeth therebetween as the pick-up device rotates, said stripper bars extending rearwardly and sloping upwardly above said pick-up device from said semi-circle and positioned relative to said pick-up device such that the lengths of said teeth projecting therethrough progressively shorten as they are moved rearwardly between said stripper bars for continually propelling the picked-up vegetation upwardly and rearwardly while progressively withdrawing therefrom; and rearward extensions of the respective stripper bars sloping downwardly as a discharge deck for the picked-up vegetation, said teeth continuing to extend through said discharge deck along substantially the length thereof to propel said vegetation toward the discharge end thereof.

2. A combination according to claim 1, wherein the means for driving the pick-up device comprises power means and control means independant of those employed for effecting travel of the implement along the windrows so speed of rotation of said pick-up device can be adjusted as desired relative to speed of travel of the implement.

3. A combination according to claim 2, wherein the means for driving the pick-up device comprises a hydraulic motor and infinitely variable hydraulic flow control valve means for connection to a hydraulic motivating system.

4. A combination according to claim 1, wherein the teeth of the pick-up device are spring-loaded but fixed in position relative to their respective mountings in the pick-up device.

5. A combination according to claim 1, wherein the pick-up device comprises shaft means journaled in the frame, end plates, and structural steel angles symmetrically placed around a circle concentric with said shaft means, said angles having their interiors facing outwardly and carrying the pick-up fingers.

6. A combination according to claim 1, wherein the frame has a transverse member at its rear end; the stripper bars are endless loops, respectively, comprehending the pick-up device forwardly and said transverse frame member rearwardly and being supported by said transverse frame member; there is a substantially cylindrical bar extending transversely across said discharge deck for preventing hang-up of the discharging vegetation on said transverse frame member; and the pick-up device is arranged so that its teeth are completely withdrawn from the discharge deck short of said transverse frame member and said cylindrical bar.

7. A combination according to claim 6, wherein the cylindrical bar is a length of plastic pipe.

8. A combination according to claim 1, wherein a pair of adjustable side wings is provided for selectively determining the width of the stream of fluffed material being discharged from the implement.

9. A combination according to claim 8, wherein the side wings are adjustably positioned at the rear end of the discharge deck at opposite sides thereof, respectively, and extending rearwardly therefrom.

10. A combination according to claim 1, wherein a row of hold-down bars is provided across the frame forwardly of and substantially parallel with the pick-up device, said hold-down bars being collectively adjustable in position toward or away from said pick-up device.

11. A combination according to claim 1, wherein the downwardly sloping extensions of the stripper bars connect to the upper portions of corresponding stripper bars at the upper end of the discharge deck and overhang said deck as a launching pad for the vegetation being propelled onto said deck by the teeth of the pick-up device.

12. A combination according to claim 6, wherein the cylindrical bar is mounted on top of the discharge deck.

13. A combination according to claim 12, wherein the plastic pipe is mounted on top of the discharge deck.

* * * * *